(12) United States Patent
Horiuchi

(10) Patent No.: US 6,264,241 B1
(45) Date of Patent: Jul. 24, 2001

(54) FRAME STRUCTURE FOR SADDLING TYPE VEHICLE

(75) Inventor: Tadanori Horiuchi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/132,509

(22) Filed: Aug. 11, 1998

(30) Foreign Application Priority Data

Sep. 12, 1997 (JP) .................................................. 9-248589

(51) Int. Cl.[7] .................................................. B62D 21/00
(52) U.S. Cl. .......................... 280/781; 280/788; 180/291
(58) Field of Search ........................ 280/785, 788, 280/781; 180/291; 296/204

(56) References Cited

U.S. PATENT DOCUMENTS

| | | | |
|---|---|---|---|
| 880,025 | * | 2/1908 | Herman ................................ 280/785 |
| 2,711,340 | * | 6/1955 | Lindsay ................................ 296/204 |
| 3,806,149 | * | 4/1974 | Huszar ................................ 180/312 |
| 4,662,467 | * | 5/1987 | Arai et al. ............................ 180/210 |
| 4,817,985 | * | 4/1989 | Enokimoto et al. ................. 280/690 |
| 4,852,678 | * | 8/1989 | Yamaguchi .......................... 180/219 |
| 4,892,165 | * | 1/1990 | Yasui et al. .......................... 180/190 |
| 5,265,690 | * | 11/1993 | Amundsen et al. ................. 180/89.1 |
| 5,704,643 | * | 1/1998 | Yamanaka et al. .................. 280/781 |
| 5,833,269 | * | 11/1998 | Gastesi ................................ 280/785 |

FOREIGN PATENT DOCUMENTS 1-109186    4/1989  (JP) .

\* cited by examiner

Primary Examiner—Brian L. Johnson
Assistant Examiner—Deanna Draper
(74) Attorney, Agent, or Firm—Birch, Stewart, Kolasch & Birch, LLP

(57) ABSTRACT

A front portion of a vehicle body frame is provided with a structure wherein the number of locations to be welded can be reduced and is superior in the absorption of an impact. A vehicle body frame main part having a substantially T-shape as viewed in side elevation is formed from a pair of left and right main frames, center frames and rear frames, and supports an engine and rear wheel suspension mechanisms thereon. A vehicle body frame front portion supports a front wheel suspension mechanisms and includes a lower steering stay extending obliquely downwardly and rearwardly as viewed in a side elevation from front end portions of the main frames, and down pipes and front side members of a lower frame which make a substantially triangle whose oblique line is provided by the lower steering stay. The lower steering stay in its entirety including a cross portion to which the main frames are welded and a pair of left and right arm portions extending rearwardly from rear end portions of the cross portion is formed as a unitary member by casting, and rear end portions of the arm portions are fastened to the front side members of the lower frame by means of bolts. Rear side members of the lower frame are removably mounted between the front side members and lower end portions of the center frames so that the engine can be removed downwardly if the rear side member is removed.

22 Claims, 8 Drawing Sheets

FRAME STRUCTURE FOR SADDLING TYPE VEHICLE

BACKGROUND OF THE INVENTION

1. Field of the Invention

This invention relates to a frame structure for a saddling type vehicle such as a four-wheel buggy for driving on uneven ground.

2. Description of Background Art

A four-wheel buggy is generally constructed such that a pair of left and right vehicle body frames, for supporting an engine thereon, are formed substantially in a loop-like configuration from pipe members. In addition, at portions of a front portion of the vehicle body frames at which a front wheel suspension apparatus is provided, reinforcement pipes extend obliquely forwardly and rearwardly and upwardly and downwardly as viewed in a side elevation in an intersecting relationship. Further, in Japanese Patent Laid-Open Application No. Heisei 1-109186, a four-wheel buggy is disclosed wherein front end portions of a pair of left and right loop frames having a substantially loop-like configuration as viewed in a side elevation and supporting an engine thereon are connected to a box-like member and support portions for a front wheel suspension apparatus is provided on side faces of the box-like member.

When a front portion of a vehicle body on which front wheel suspension mechanisms are provided are formed from a large number of reinforcement pipe members as described above, since a large number of portions to be welded are involved, many welding steps are required and a high cost is required. In addition, quality control is difficult due to the influence of heat upon welding.

Meanwhile, where a front portion of a vehicle body is formed as a unitary box-like member as disclosed in Japanese Patent Laid-Open Application No. Heisei 1-109186, the number of welding steps is reduced advantageously. However, since the entire front portion of the vehicle body has a high rigidity, if, during driving on uneven ground, an impact is inputted to a lower portion of the front portion of the vehicle body from the ground side, then the impact is transmitted to the entire vehicle body frame, and therefore, also it is desired that the front portion of the vehicle body should be constructed so as to absorb an impact to some degree.

SUMMARY AND OBJECTS OF THE INVENTION

In order to solve the subject described above, a frame structure for a saddling type vehicle of the present invention wherein an engine is supported below a pair of left and right main frames extending in forward and backward directions and a pair of left and right steering front wheels are suspended independently of each other and are provided on the left and right of a front portion of a vehicle body. A pair of left and right lower members extend downwardly from front end portions of the left and right main frames and further extend rearwardly substantially in parallel to the main frames. An inclined frame extends rearwardly obliquely downwardly as viewed in a side elevation from front end portions of the left and right main frames to positions rearwardly of the front wheel axles and include rear end portions coupled to rear portions of the left and right lower members. The inclined frame and the lower members serve as support elements for a front wheel suspension mechanisms and the inclined frame are formed by casting or forging.

The invention according to a second aspect includes the rear end portions of the inclined frame and the lower members that are coupled to each other by fastening.

The invention according to a third aspect includes lower members that are formed from members having a higher extensibility than the inclined frame.

The invention according to a fourth aspect includes a pair of left and right engine support members extending downwardly from the left and right main frames on the opposite sides of a rear portion of the engine, and an engine underlying member extending below the engine for removably connecting lower end portions of the engine support members and the rear end portions of the left and right lower members to each other.

With the invention according to the first aspect, since the support portions for the front wheel suspension mechanisms are formed from the oblique inclined frame and the lower members at the front portion of the vehicle frame and the inclined frame is formed as a unitary member by casting or forging, the number of portions to be welded can be reduced. As a result, the number of production steps can be reduced to reduce the cost. In addition, the influence of heat is reduced to facilitate quality control. Further, compared with another structure wherein an entire front portion of a vehicle body is formed integrally in a box-like configuration, the rigidity of the lower side of the front portion of the vehicle body can be reduced, and even if an impact is inputted from the ground side, the impact can be absorbed well. Consequently, the frame structure is suitable for driving on uneven ground.

With the invention according to the second aspect, since the rear end portions of the inclined frame are fastened to the lower members, the number of portions to be welded can be further reduced.

With the invention according to the third aspect, since the lower members are formed as members having an extensibility higher than that of the inclined frame, absorption of an impact upon ground hitting can be efficiently performed.

With the invention according to the fourth aspect, since the engine underlying member can be removed solely, the engine can be mounted or dismounted from below the main frames, and comparing with another case wherein an engine is mounted or dismounted from the side of a vehicle body as in the prior art, the mounting or dismounting operation is facilitated remarkably, and as a result, the maintenance facility is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
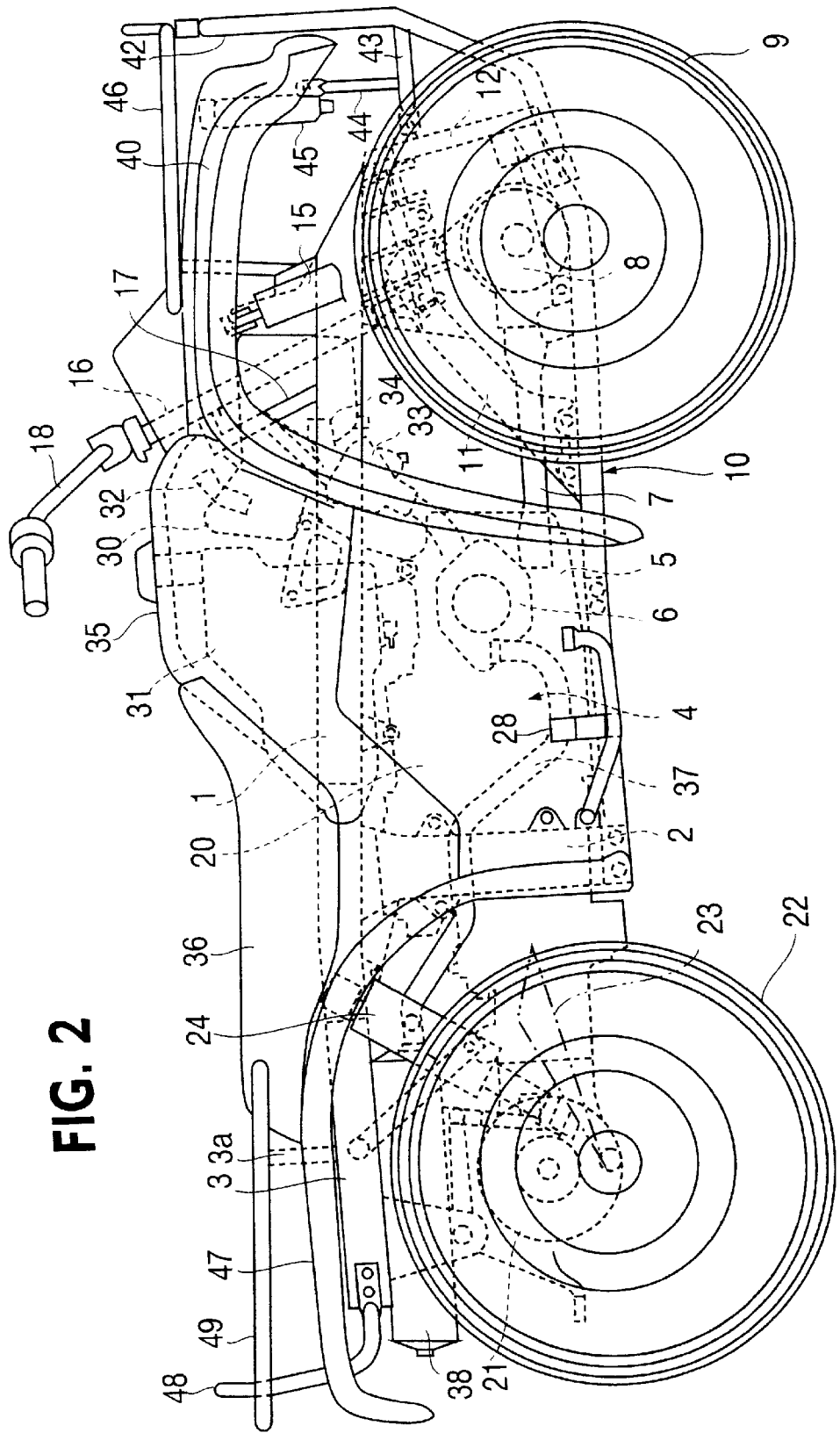
FIG. 2 is a side elevational view of a four-wheel buggy according to an embodiment of the present invention.
Figure 3:
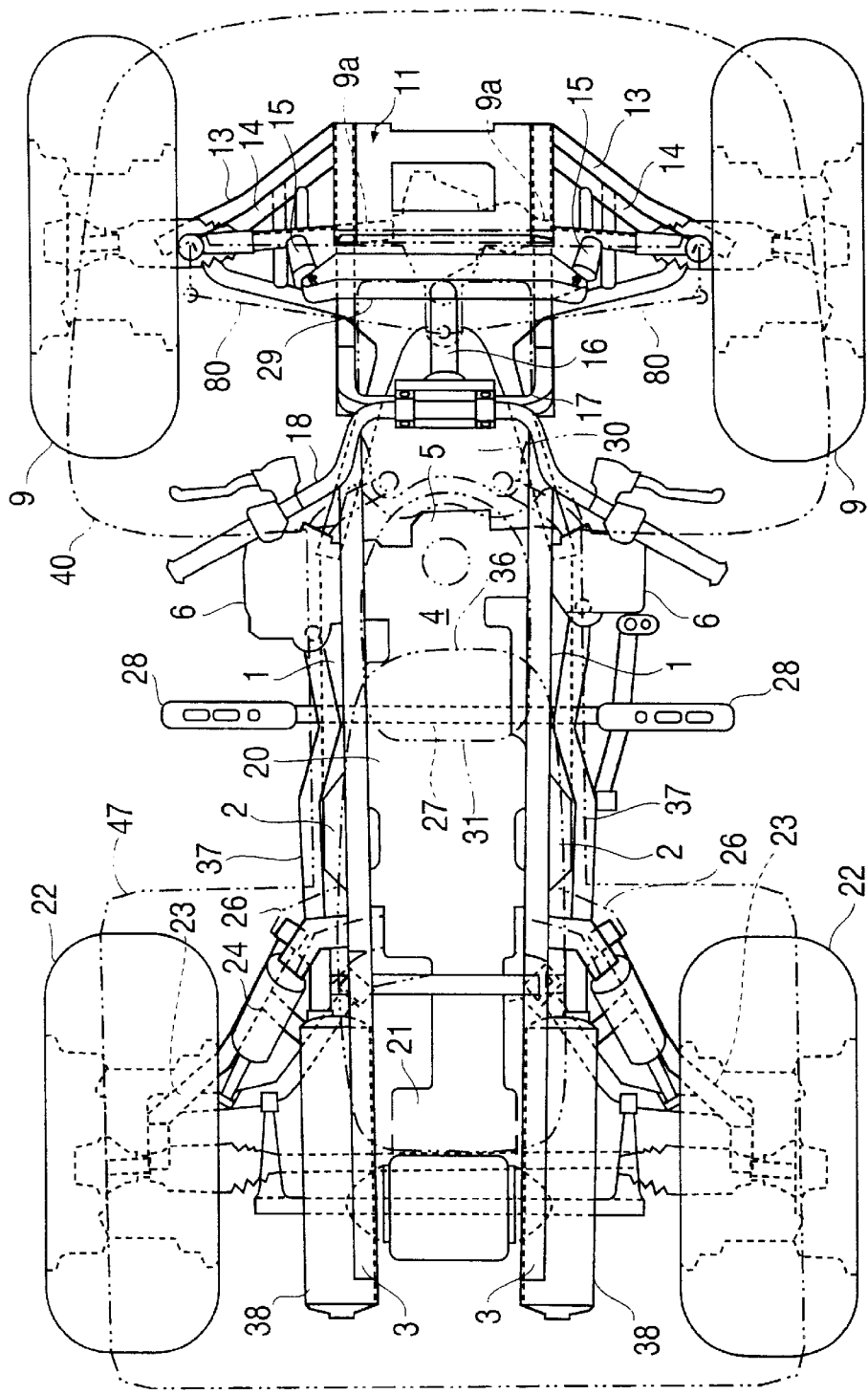
FIG. 3 is a plan view principally illustrating a skeleton part of the four-wheel buggy.

Referring first to FIGS. 2 and 3, the present four-wheel buggy includes main frames 1 extending substantially horizontally in forward and rearward directions from a front portion of a vehicle body towards a central portion, center frames 2 extending in upward and downward directions from rear end portions of the main frames 1 and having a substantially U-shape as viewed in a side elevation. Rear frames 3 extend substantially horizontally rearwardly from rear ends of upper end portions of the center frames 2. A pair of frame structures each composed of a main frame 1, a center frame 2 and a rear frame 3 generally have a substantially T-shape as viewed in a side elevation, and the frame structures are provided in left and right pairs.

An engine 4 of the horizontally opposed type is supported on the main frames 1 and the center frames 2. The engine 4 includes a crankcase 5 disposed at a central portion of the vehicle body, and a pair of left and right cylinders 6 projecting sidewardly of the vehicle body from the crankcase 5 each in a substantially horizontally lying condition. A pair of left and right front wheels 9 are driven through a front wheel drive shaft 7 which extends forwardly from a front end portion of the crankcase 5 and a front wheel gear box 8 at an end of the front wheel drive shaft 7. A front wheel axle 9a is illustrated in FIG. 3.

The vehicle body front portion which supports front wheel suspensions is formed from a front end portion of the main frames 1, and a lower frame 10 and a lower steering stay 11 which support the front end portions of the main frame 1 and the front wheel gear box 8. The lower frame 10 includes a pair of left and right pipe members extending substantially in parallel in forward and rearward directions below the main frames 1, and front ends thereof are connected to lower end portions of down pipes 12 which extends in a left and right pair downwardly from front ends of the lower steering stay 11.

A front half portion of the lower frame 10 cooperates with the down pipes 12 to exhibit the shape of substantially a triangle as viewed in side elevation whose oblique line is provided by the lower steering stay 11, and a rear half portion of the lower frame 10 extends rearwardly below the engine 4 and is connected at rear ends thereof to lower end portion of the center frames 2.

The lower steering stay 11 correspond to the inclined frame of the present invention and is a single strength member which has a width substantially equal to the width of the vehicle body and is entirely cast integrally such that it interconnects the left and right main frames 1, lower frame 10 and down frames 12.

Figure 4:
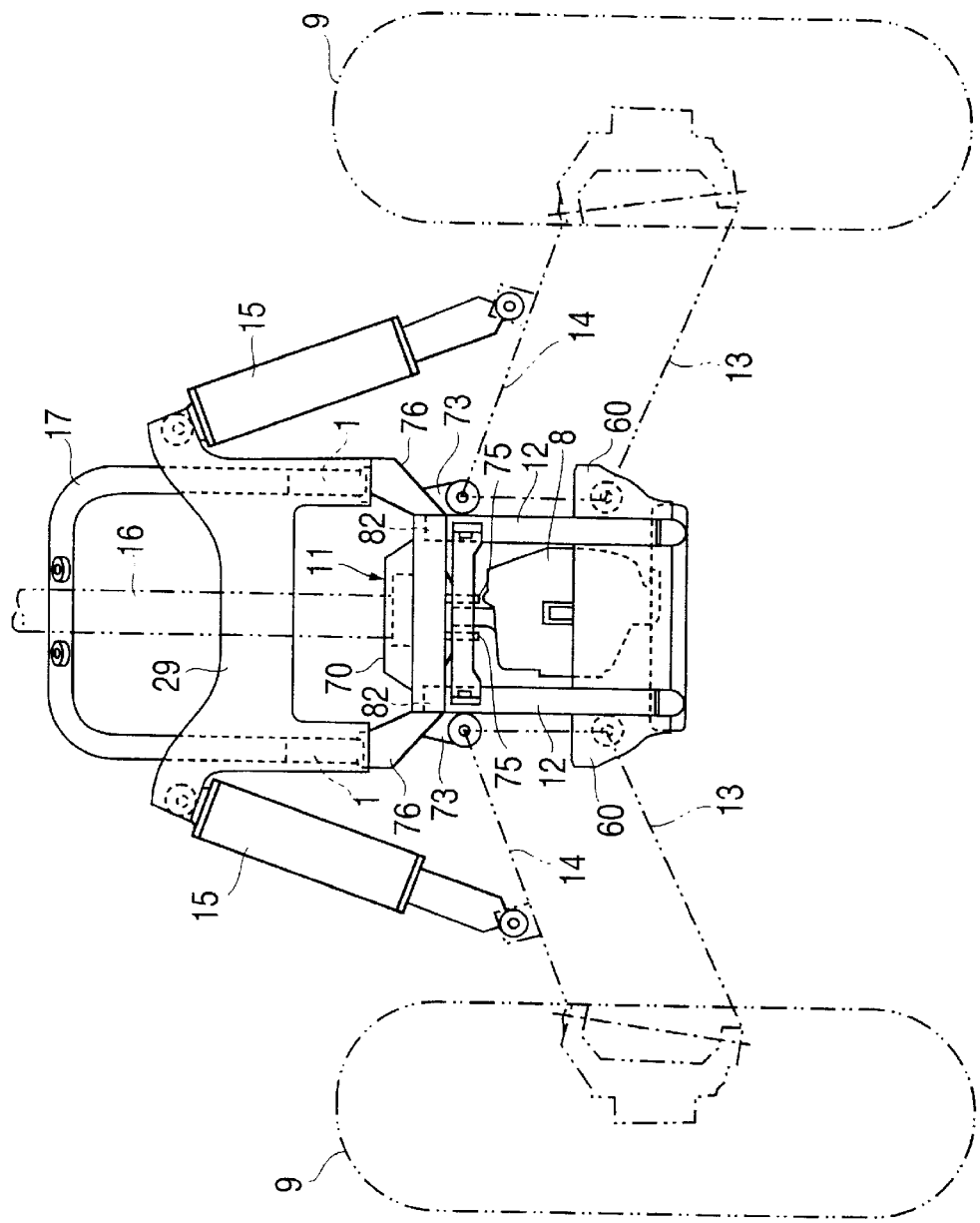
FIG. 4 is a view schematically illustrating a front face side of the four-wheel buggy.
Figure 5:
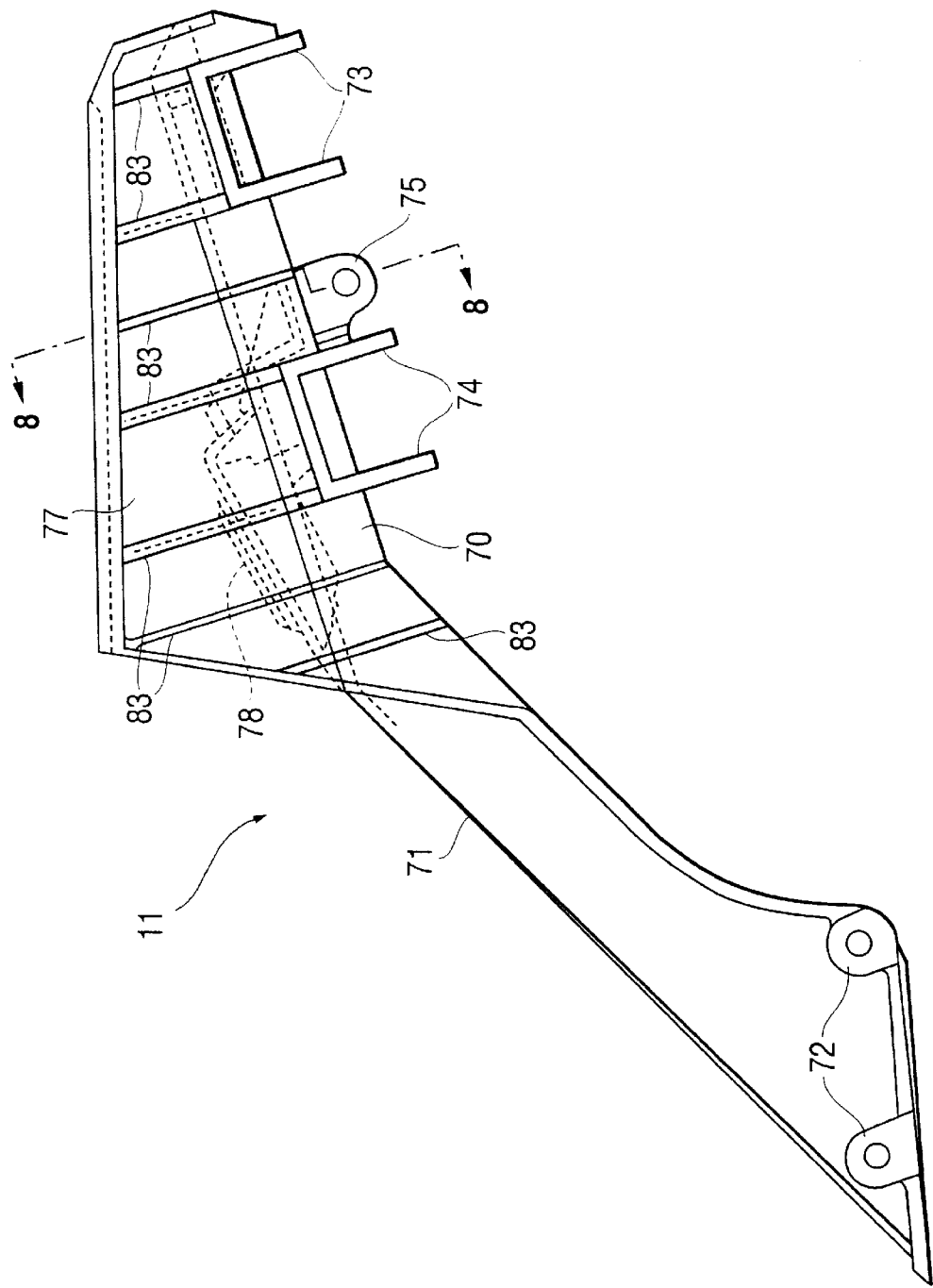
FIG. 5 is a side elevational view of an inclined frame.
Figure 6:
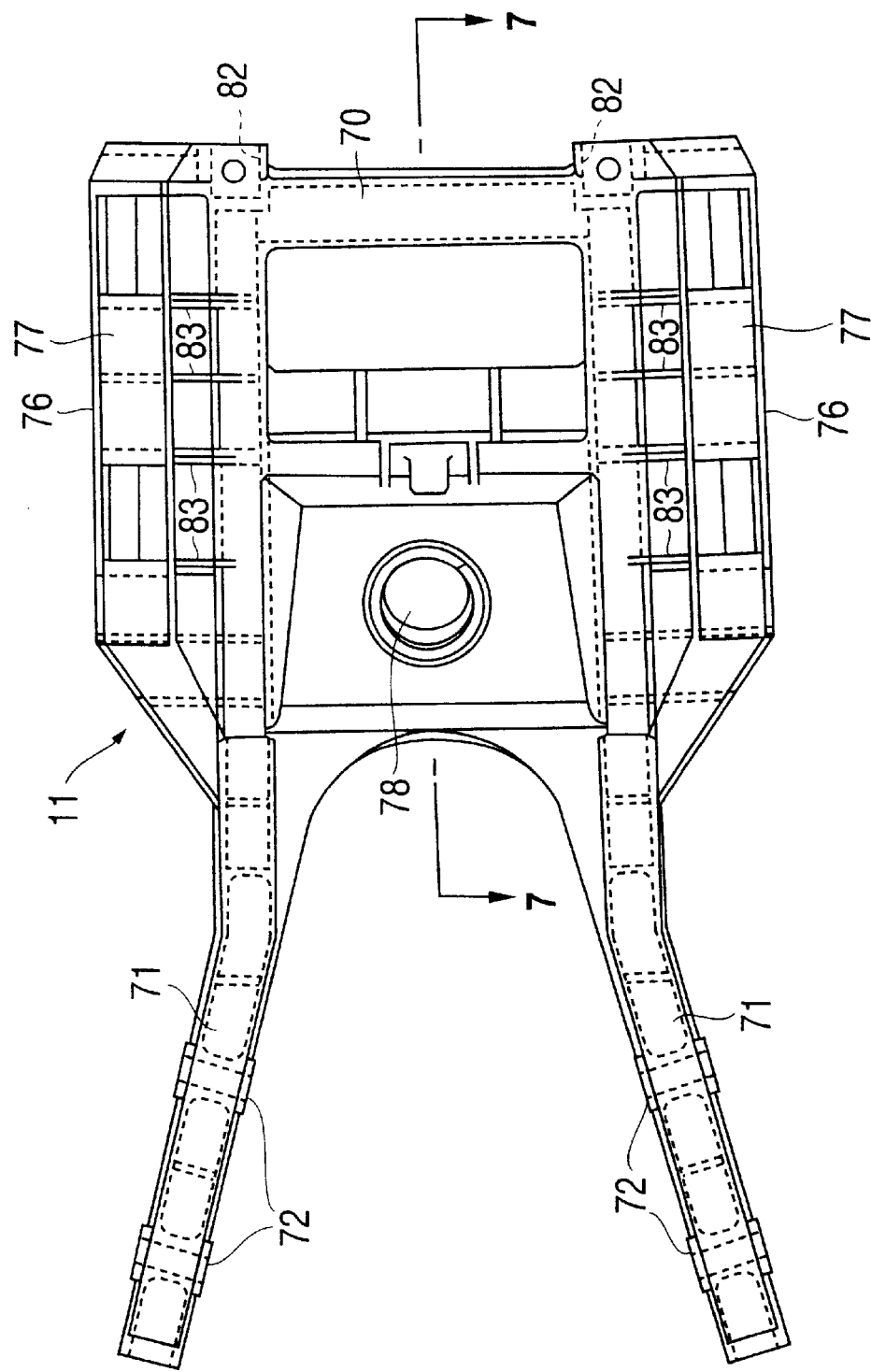
FIG. 6 is a plan view of the inclined frame.

The front wheel suspension mechanisms are double wishbone type front suspensions which suspend the left and right front wheels 9 independently of each other, and each of the left and right front wheel suspension mechanisms includes a lower arm 13 supported on the lower frame 10, an upper arm 14 supported on the lower steering stay 11, and a front cushion 15 for damping rocking movements of the arms as illustrated in FIG. 4.

A lower end portion of a steering shaft 16 is supported at a central portion of an upper face of the lower steering stay 11, and the steering shaft 16 extends obliquely upwardly in a rearwardly inclined condition and is supported at an intermediate portion thereof on a stay 17 which extends upwardly from the main frames 1 while a handle bar 18 is mounted at an upper end portion of the steering shaft 16.

An automatic gear 20 and a rear wheel gear box 21 are provided at a rear portion of the crankcase 5, and a pair of left and right rear wheels 22 are power driven by the engine 4 through the automatic gear 20 and the rear wheel gear box 21. The engine 4 cooperates with the automatic gear 20, the rear wheel gear box 21 and the crankcase 5 to form a power unit of a unitary member.

Also rear wheel suspension mechanisms have a structure wherein the left and right rear wheels 22 are suspended independently of each other and is of the semi-trailing type wherein swing arms 23 supported on side faces of the speed change gear case of the automatic gear 20 are damped by rear cushions 24. Also the rear wheel suspension mechanisms are provided in left and right pairs.

As illustrated in FIG. 3 a stay 25 is formed on a side face of an upper end portion of a center frame 2 in such a manner as to project outwardly for supporting an upper end of a rear cushion 24. A stay 26 is formed on a side face of the speed change gear case for supporting a swing arm 23. A cross member 27 is mounted on the lower frame 10 and extends transversely below the engine 4. A step 28 is provided at each of the opposite ends of the cross member 27. A cross member 29 is provided for interconnecting upper faces of front end portions of the left and right main frames 1. The opposite left and right ends of the cross member 29 project sidewardly and serve as stays for supporting upper end portions of the front cushions 15.

As shown in FIG. 2, an intake box 30 and a fuel tank 31 are supported on the left and right main frames 1 above the crankcase 5. The intake box 30 is provided forwardly of the fuel tank 31 such that it projects forwardly to a position near to the supporting portions of the front cushions 15, and takes in external air from an intake duct 32 which is provided at an upper portion of the intake box 30 and projects upwardly and forwardly.

An air cleaner is provided on an upper half side of the intake box 30, and introduction pipes 34 of carburetors 33 extend into a lower half side of the intake box 30 which is the clean side of the air cleaner. Such carburetors 33 are provided in left and right pairs, and the downstream sides of them are connected to intake ports of the left and right cylinders 6.

A rear portion side of the intake box 30 and the fuel tank 31 are covered from above with a tank cover 35, and a saddling type seat 36 is disposed such that it extends rearwardly from a rear wall of the tank cover 35 and is supported on a central portion of the vehicle body frame composed of the main frames 1, center frames 2 and rear frames 3.

Exhaust pipes 37 extend as a left and right pair rearwardly from exhaust ports of the left and right cylinders 6 to the left and right of the vehicle body, and are connected to a pair of left and right mufflers 38 supported at rear end portions of the left and right rear frames 3.

The front portion of the vehicle body is covered with a vehicle body front portion cover 40. The vehicle body front portion cover 40 is made of plastics and serves also as a front fender which covers upper and rear portions of the left and right steering front wheels 9. A rear portion of the vehicle body front portion cover 40 is connected to the tank cover 35 and serves as a rear wall which partitions the steering front wheels 9 and the crankcase 5.

It is to be noted that a front bumper 42 is provided which projects forwardly once from a front end portion of the lower frame 10 and then is bent and extends upwardly. A radiator 45 is supported on a support member 43, which interconnects the front bumper 42 and the down pipes 12, by a stay 44. Also the radiator 45 is covered with the vehicle body front portion cover 40. Further, a front carrier 46 which extends rearwardly substantially horizontally from an upper end portion of the front bumper 42 is provided above the vehicle body front portion cover 40.

Meanwhile, a rear portion of the vehicle body is covered with a rear cover 47 which serves also as a rear fender which covers over front and upper portions of the rear wheels 22, and a rear bumper 48 which projects upwardly from the rear frames 3 and a rear carrier 49 supported on a stay 3a are provided on the rear cover 47.

Subsequently, a frame structure around each of the front wheel suspensions is described in detail.

Each of the left and right lower frames 10 includes a front side member 50 and a rear side member 51 which are separated forwardly and rearwardly at a location substantially below the cylinder portions of the engine 4. The rear side member 51 serves as the engine underlying member of the invention and is placed and removably connected at a front end portion thereof on and to a rear end portion of the front side member 50 by means of bolts 52 while a rear end portion of the rear side member 51 is similarly placed on and removably connected to a lower end portion of the center frames 2 by means of bolts 53.

The cross member 27 which extends transversely below the engine 4 is mounted on the rear side members 51, and since also the cross member 27 and the steps 28 are removed integrally if the bolts 52 and 53 are removed to remove the rear side members 51 from the front side members 50 and the center frames 2, a member which makes an obstacle to mounting and dismounting is not present below the engine 4, and the cross member 27 and the steps 28 can be freely removed downwardly.

It is to be noted that the engine 4 is removably connected to the main frames 1 by hanger plates 54, 55 by means of bolts 56, and is connected also to the center frames 2 at hanger portions 57, 58 and 59 of the same on side faces overlapping with the center frames 2 similarly by means of bolts 56. Thus, if the bolts 56 are removed after the rear side members 51 are removed, then the engine 4 can be removed from below the main frames 1.

The left and right front side members 50 are welded at front ends thereof to the down pipes 12, and the front side members 50 and the down pipes 12 serve as the lower member of the present invention. Support projections 60, 61 for pivotally supporting one end portions of the lower arms 13 are formed at corner portions of the front side members 50 with the down pipes 12 and intermediate portions rearwardly of the corner portions.

Nut portions 62 to which a lower end portion of the front bumper 42 is fastened by bolts are formed at intermediate portions between the support projections 60 and the support projections 61, and stays 64 for fastening lower end portions of the lower steering stay 11 by means of bolts 63 are welded to portions rearwardly of the support projections 61 such that they project upwardly.

The lower steering stay 11 has, as illustrated in FIGS. 5 to 8, on a front half side thereof, a cross portion 70 having a width substantially equal to the width between the left and right main frames 1, and a pair of left and right arm portions 71 are integrally formed on the cross portion 70 such that they extend rearwardly and obliquely downwardly from the cross portion 70.

Each of the left and right arm portions 71 has a boss portion 72 formed at a lower end portion thereof for being fastened to a stay 64 described above, and they are expanded outwardly on lower sides thereof such that lower end portions thereof may be overlapped with the stays 64 provided on the left and right front side members 50. Further, support projections 73, 74 for pivotally supporting one end portion of the upper arms 14 are formed at front and rear portions on the opposite left and right sides of the cross portion 70 while a stay 75 for supporting the front wheel gear box 8 is formed on a lower face of a central portion of the arm portions 71 such that it projects downwardly.

Figure 7:
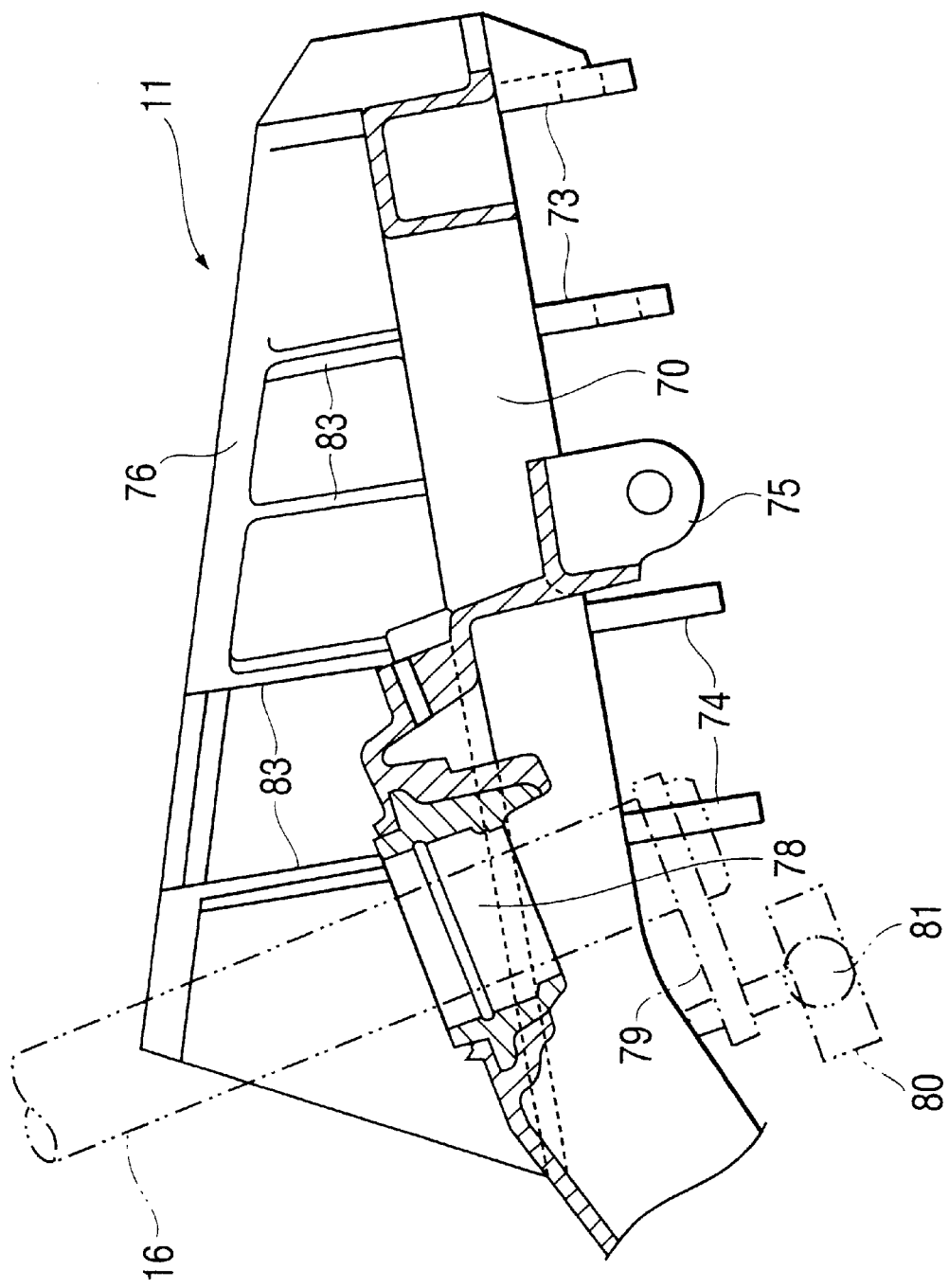
FIG. 7 is a sectional view taken along line 7—7 of FIG. 6.
Figure 8:
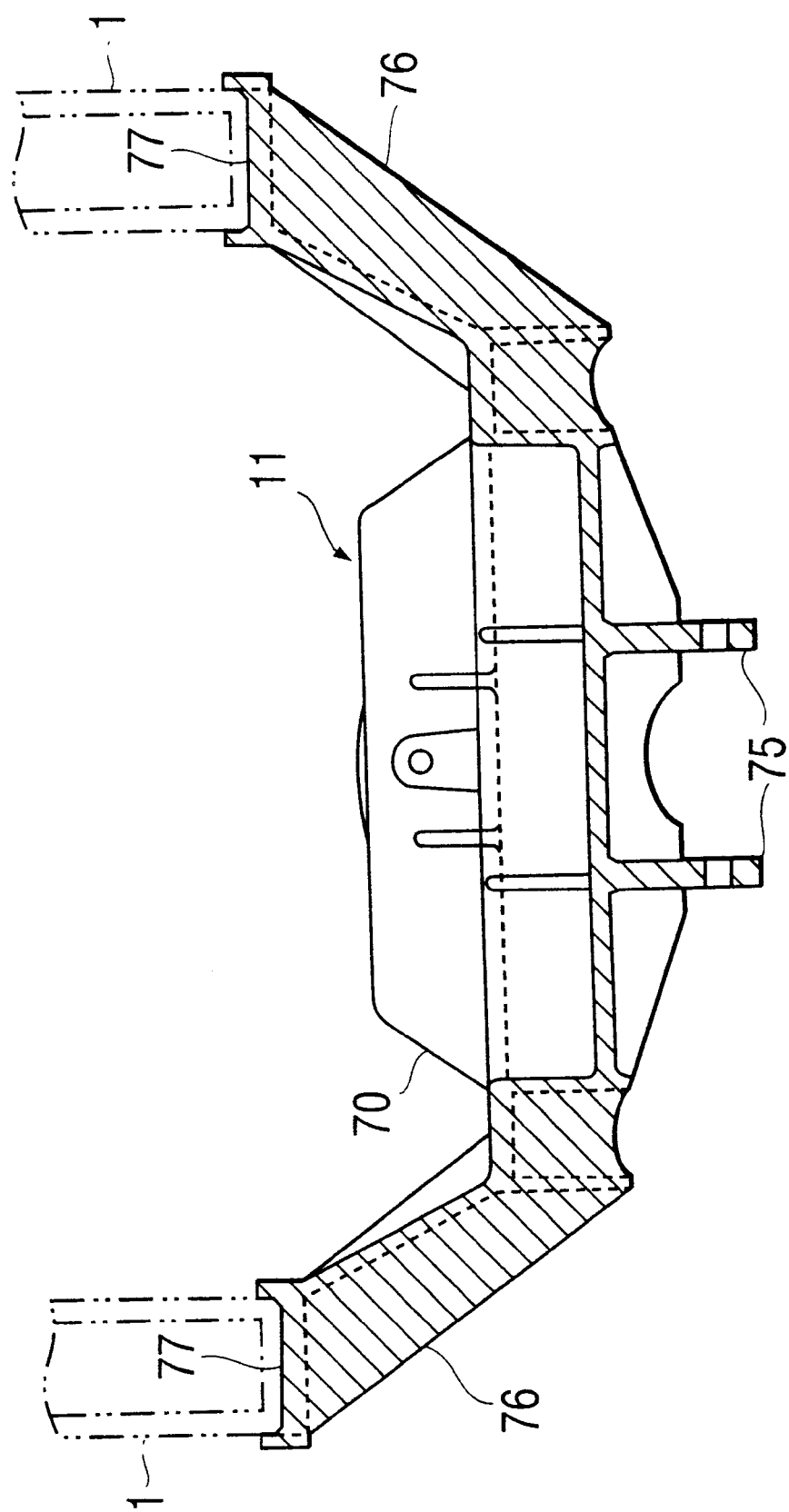
FIG. 8 is a sectional view taken along line 8—8 of FIG. 5.

Further, as is apparent from FIG. 8, arm portions 76 which project upwardly in an expanding condition from the opposite left and right sides of the cross portion 70 are provided integrally, and lower ends of front end portions of the main frames 1 are fitted in recessed grooves 77, which are formed at upper ends of the arm portions 76 and extend in the forward and rearward directions. Further, as illustrated in FIG. 7, a bearing hole 78 for bearing and supporting a lower end portion of the steering shaft 16 is formed on an upper face of a central portion of the cross portion 70.

A link plate 79 is provided at a lower end portion of the steering shaft 16 and is supported in the bearing hole 78 extending into a space between the left and right arm portions 71 and is connected in the space to the left and right tie rods 80 by joints 81 such that the left and right front wheels 9 may be steered by rotational motion of the steering shaft 16.

Downwardly open recessed portions 82 are formed at front end portions of base portions of the left and right arm portions 76, and upper end portions of the down pipes 12 are fitted in and positioned by the recessed portions 82 as illustrated in FIG. 4. A portion of the cross portion 70 is reinforced by a large number of ribs 83 and contributes to an increase in rigidity and a reduction in weight.

It is to be noted that the lower steering stay 11 is a member of a comparatively high rigidity which is entirely formed integrally by casting while the lower frame 10 is produced together with the front side members 50 and the rear side members 51 using ordinary steel pipes and is a member having a high extensibility compared with the lower steering stay 11.

Meanwhile, also the center frames 2 are cast members similar to the lower steering stay 11 while the main frames 1 and the rear frames 3 are vertically elongated angular tubular members formed from extruded members of an aluminum alloy or the like, and the main frames 1 and the center frames 2 are integrated further firmly by welding after the connection portions are fitted with each other. However, the center frames 2 and the lower steering stay 11 need not be produced by casting, but may be produced by forging.

Figure 1:
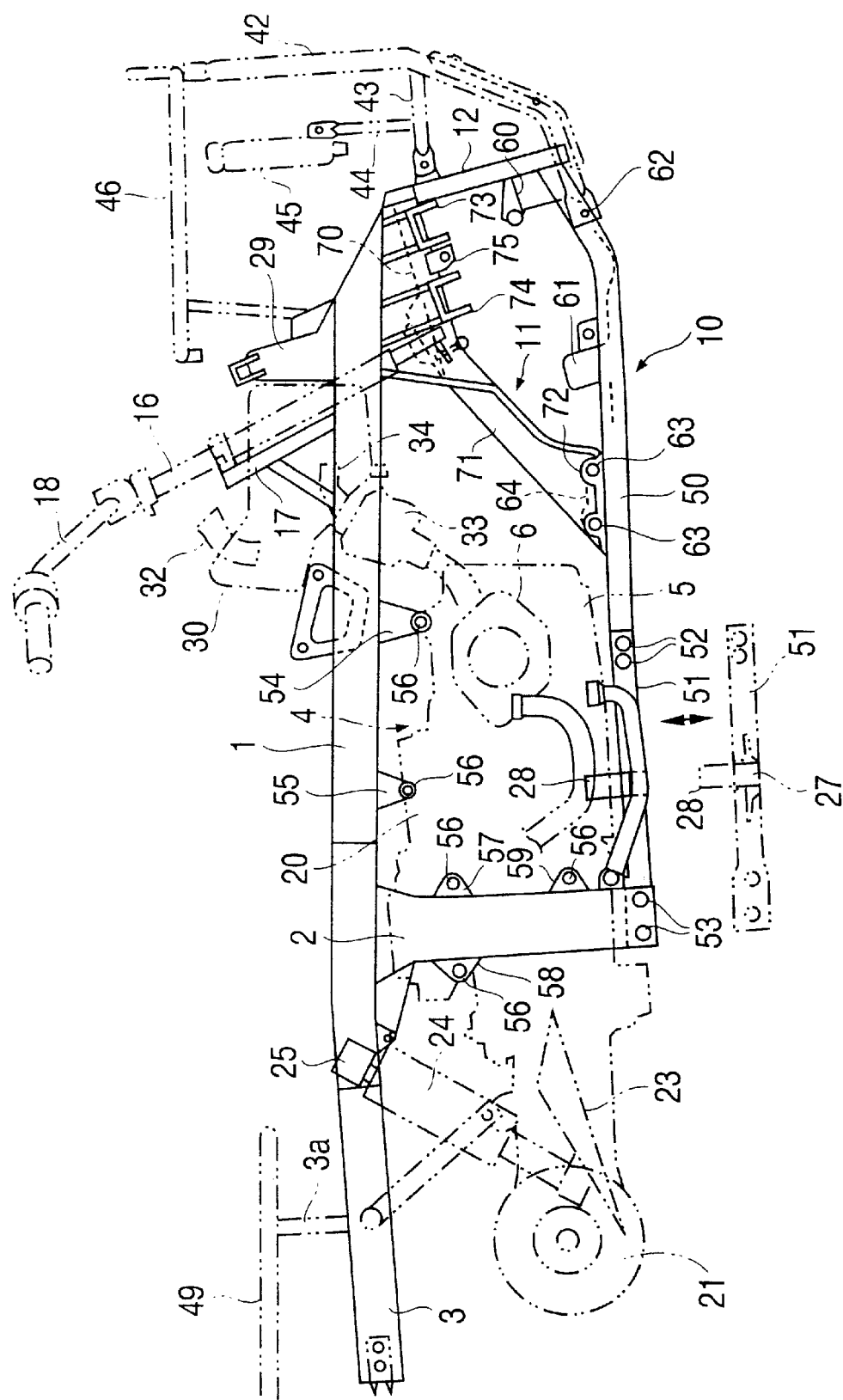
FIG. 1 is a side elevational view of a vehicle body frame.

Now, operation of the present embodiment is described. Since the lower steering stay 11 is formed as a unitary article by casting as shown in FIG. 1, the lower steering stay 11 can be coupled to the main frames 1 and the lower frame 10 only by welding the main frames 1 to the left and right of the cross portion 70, fitting the down pipes 12 into the left and right front end portions of the cross portion 70 and further fastening the arm portions 71 to the front side members 50 by means of the bolts 63.

Accordingly, compared with a case wherein, similarly as in the prior art, a plurality of reinforcement pipes are crossed in a substantially cross shape with each other at a front portion of a vehicle body and they are coupled to each other by welding, the structure is simplified remarkably, and an assembling operation is facilitated by a reduction of the locations to be welded.

Besides, since the number of locations to be welded is reduced, deformation by an influence of heat is reduced to the same extent, and quality control is facilitated. Further, since the lower steering stay 11 itself can be formed with a high rigidity and a low weight, reduction in weight of the entire vehicle body can be realized with a rigidity of the front portion of the vehicle body frame substantially equal to that of the prior art being secured.

Further, since the recessed grooves 77 are provided on the cross portion 70 to position the main frames 1 and the recessed portions 82 are provided to position the down pipes 12, the efficiency in an assembling operation is also improved.

Furthermore, since a combination wherein the lower steering stay 11 is formed from a cast article of a high rigidity and the lower frame 10 is formed from a member having a higher extensibility than the lower steering stay 11 is used, even if an impact is inputted, during driving on uneven ground, to the lower frame 10, particularly to the down pipes 12, the front side member 50 or the like from the ground side, the impact can be absorbed well.

Accordingly, since the upper portion side of the front portion of the vehicle body frame to which an impact from the ground side is not inputted very much is provided with a high rigidity to ensure the rigidity of the entirety while the extensibility is secured for the lower portion side to which an impact from the ground side may possibly be inputted, a vehicle body frame structure which is high in rigidity and superior in absorption of an impact and is suitable for a vehicle which runs on an uneven ground can be obtained.

Besides, since the lower frame 10 is separated into forward and rearward portions and the rear side members 51 which serve as lower portions of the engine 4 are removably mounted, if the rear side members 51 are removed, then the engine 4 can be removed from below the main frames 1. Accordingly, compared with another case wherein the engine 4 is removed from a side of a vehicle body frame as in the prior art, an operation of mounting or dismounting the engine 4 is greatly facilitated, and the maintenance facility is improved.

It is to be noted that the present invention is not limited to the embodiment described above and can be modified in various manners.

For example, the inclined frame need not be a bearing member for the steering shaft 16 like the lower steering stay 11, and may be constructed only as a reinforcement member for the front portion of the vehicle body frame and a support member for the front wheel suspension mechanisms. Further, the lower member may not be formed from a construction divided into the down pipes 12 and the front side members 50, but may be constructed as a continuous unitary member.

Further, where for an engine which can be mounted or dismounted by removing the rear side members 51, not an embodiment wherein the members from the crankcase to the rear wheel gear box are integrated as in the embodiment, but an embodiment wherein a power transmission like a chain drive is adopted, the engine may be constructed only from the crankcase and the speed change gear, but where a V-belt type speed change gear is adopted, the engine may be part of a speed change gear which includes the crankcase and the driving pulley side.

The invention being thus described, it will be obvious that the same may be vaned in many ways. Such variations are not to be regarded as a departure from the spirit and scope of the invention, and all such modifications as would be obvious to one skilled in the art are intended to be included within the scope of the following claims.

What is claimed is:

1. A frame structure for a saddling type vehicle wherein an engine is supported below a pair of left and right main frames extending in forward and backward directions, a pair of left and right steering front wheels are suspended independently of each other on a left and a right front portion of a vehicle body, comprising:

a pair of left and right lower members extending downwardly from front end portions of said left and right main frames and further extending rearwardly substantially in parallel to said main frames; and an inclined frame extending rearwardly and obliquely downwardly, as viewed in a side elevation, from the front end portions of said left and right main frames to positions rearwardly of front wheel axles and having rear end portions coupled to portions of said left and right lower members;

said inclined frame and said lower members operatively support elements for front wheel suspension mechanisms, said inclined frame is cast or forged and said inclined frame includes a cross portion having a width substantially equal to a width between the left and right main frames and a pair of left and right arm portions integrally formed on the cross portion and extending rearwardly and obliquely downwardly from the cross portion.

2. The frame structure for a saddling type vehicle according to claim 1, wherein the rear end portions of said inclined frame and said lower members are coupled to each other by fastening.

3. The frame structure for a saddling type vehicle according to claim 1, wherein said lower members are formed from members having extensibility relative to said inclined frame.

4. The frame structure for a saddling type vehicle according to claim 1, wherein a pair of left and right engine support members extend downwardly from said left and right main frames on the opposite sides of a rear portion of said engine, and an engine underlying member extends below said engine for removably connecting lower end portions of said engine support members and the rear end portions of said left and right lower members to each other.

5. The frame structure for a saddling type vehicle according to claim 4, wherein said pair of left and right lower members each include a front side member and a rear side member, s aid engine underlying member being said rear side member of respective left and right lower members.

6. The frame structure for a saddling type vehicle according to claim 5, and further including a cross member and steps removably secured to respective rear side members of said left and right lower members.

7. The frame structure for a saddling type vehicle according to claim 1, wherein said pair of left and right lower members include down pipes secured to respective left and right main frames and a rear portion of the lower frame that extends rearwardly to below an engine of the vehicle.

8. The frame structure for a saddling type vehicle according to claim 1, and further including a steering shaft for the saddling type vehicle wherein the steering shaft is supported by said inclined frame for operatively imparting movement to said left and right steering front wheels.

9. The frame structure for a saddling type vehicle according to claim 1, wherein each of said pair of left and right arm portions include a boss portion formed at a lower end portion thereof for fastening to respective left and right lower members.

10. A frame structure for a saddling type vehicle comprising:
a pair of left and right main frames extending in a forward and rearward direction, said pair of left and right main frames including a front end portion and a rear end portion;
a pair of left and right lower members having a first portion extending downwardly from respective front end portions of said left and right main frames and a second portion extending rearwardly and substantially in parallel to said pair of left and right main frames, said pair of left and right lower members including front end portions and rear end portions; and
an inclined frame extending rearwardly and obliquely downwardly, as viewed in a side elevation, from the front end portions of said pair of left and right main frames and having rear end portions coupled to respective portions of said pair of left and right lower members;
said inclined frame and said pair of left and right lower members are adapted to support elements for a front wheel suspension mechanisms, said inclined frame is cast or forged and said inclined frame includes a cross portion having a width substantially equal to a width between the left and right main frames and a pair of left and right arm portions integrally formed on the cross portion and extending rearwardly and obliquely downwardly from the cross portion.

11. The frame structure for a saddling type vehicle according to claim 10, wherein the rear end portions of said inclined frame and said lower members are coupled to each other by fastening.

12. The frame structure for a saddling type vehicle according to claim 10, wherein said lower members are formed from members having extensibility relative to said inclined frame.

13. The frame structure for a saddling type vehicle according to claim 10, and further including a pair of left and right engine support members extending downwardly from said left and right main frames on the opposite sides of a rear portion of an engine, and an engine underlying member extends below said engine for removably connecting lower end portions of said engine support members and the rear end portions of said left and right lower members to each other.

14. The frame structure for a saddling type vehicle according to claim 13, wherein said pair of left and right lower members each include a front side member and a rear side member, said engine underlying member being said rear side member of respective left and right lower members.

15. The frame structure for a saddling type vehicle according to claim 14, and further including a cross member and steps removably secured to respective rear side members of said left and right lower members.

16. The frame structure for a saddling type vehicle according to claim 10, wherein said pair of left and right lower members include down pipes secured to respective left and right main frames and a rear portion of the lower frame that extends rearwardly to below an engine of the vehicle.

17. The frame structure for a saddling type vehicle according to claim 10, and further including a steering shaft for the saddling type vehicle wherein the steering shaft is supported by said inclined frame for operatively imparting movement to left and right steering front wheels.

18. The frame structure for a saddling type vehicle according to claim 10, wherein each of said pair of left and right arm portions include a boss portion formed at a lower end portion thereof for fastening to respective left and right lower members.

19. A frame structure for a saddling type vehicle wherein an engine is supported below a pair of left and right main frames extending in forward and backward directions, a pair of left and right steering front wheels are suspended independently of each other on a left and a right front portion of a vehicle body, comprising:
a pair of left and right lower members extending downwardly from front end portions of said left and right main frames and further extending rearwardly substantially in parallel to said main frames; and
an inclined frame extending rearwardly and obliquely downwardly, as viewed in a side elevation, from adjacent to the front end portions of said left and right main frames to positions rearwardly of front wheel axles and having rear end portions secured to portions of said left and right lower members;
said inclined frame and said lower members operatively support elements for front wheel suspension mechanisms, said inclined frame is a cast or forged member forming a rigid frame relative to said lower member and said inclined frame includes a cross portion having a width substantially equal to a width between the left and right main frames and a pair of left and right arm portions integrally formed on the cross portion and extending rearwardly and obliquely downwardly from the cross portion.

20. The frame structure for a saddling type vehicle according to claim 19, wherein each of said pair of left and right arm portions include a boss portion formed at a lower end portion thereof for fastening to respective left and right lower members.

21. A frame structure for a saddling type vehicle comprising:
a pair of left and right main frames extending in a forward and rearward direction, said pair of left and right main frames including a front end portion and a rear end portion;
a pair of left and right lower members having a first portion extending downwardly from respective front end portions of said left and right main frames and a second portion extending rearwardly and substantially in parallel to said pair of left and right main frames, said pair of left and right lower members including front end portions and rear end portions; and
an inclined frame extending rearwardly and obliquely downwardly, as viewed in a side elevation, from the front end portions of said pair of left and right main frames and having rear end portions secured to respective portions of said pair of left and right lower members;
said inclined frame and said pair of left and right lower members are adapted to support elements for a front wheel suspension mechanisms and said inclined frame is cast or forged forming a rigid frame relative to said lower members, and said inclined frame includes a cross portion having a width substantially equal to a width between the left and right main frames and a pair of left and right arm portions integrally formed on the cross portion and extending rearwardly and obliquely downwardly from the cross portion.

22. The frame structure for a saddling type vehicle according to claim 21, wherein each of said pair of left and right arm portions include a boss portion formed at a lower end portion thereof for fastening to respective left and right lower members.

* * * * *